(12) United States Patent
Rao et al.

(10) Patent No.: US 8,924,336 B2
(45) Date of Patent: Dec. 30, 2014

(54) FEATURE AND DEPLOYMENT RECOMMENDATION SYSTEMS AND METHODS FOR CONTENT MANAGEMENT SYSTEMS TO PROVIDE RECOMMENDATIONS FOR ENHANCED FEATURE USAGE BASED ON USAGE PATTERNS

(75) Inventors: Hari Charan Ramachandra Rao, Bangalore (IN); Chandrasekhar Atla, Bangalore (IN); Govinda Raj Sambamurthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 13/542,392

(22) Filed: Jul. 5, 2012

(65) Prior Publication Data

US 2014/0012797 A1    Jan. 9, 2014

(51) Int. Cl.
*G06N 5/02* (2006.01)
*G06Q 10/06* (2012.01)

(52) U.S. Cl.
CPC . *G06N 5/02* (2013.01); *G06Q 10/06* (2013.01)
USPC .......................................................... 706/48

(58) Field of Classification Search
CPC .......... G06N 5/02; G06Q 10/00; G06Q 10/06
See application file for complete search history.

(56) References Cited

U.S. PATENT DOCUMENTS

| | | | |
|---|---|---|---|
| 2004/0044774 A1 | 3/2004 | Mangalik et al. | |
| 2006/0248178 A1 | 11/2006 | Thieret | |
| 2006/0265630 A1* | 11/2006 | Alberti et al. | 714/38 |
| 2007/0033340 A1 | 2/2007 | Tulskie et al. | |
| 2007/0094199 A1* | 4/2007 | Deshpande et al. | 706/47 |
| 2007/0100829 A1 | 5/2007 | Allen et al. | |
| 2007/0112712 A1* | 5/2007 | Flinn et al. | 706/45 |
| 2008/0288629 A1* | 11/2008 | Fisher et al. | 709/224 |
| 2009/0172696 A1 | 7/2009 | Meliksetian et al. | |
| 2009/0198639 A1* | 8/2009 | Narayanaswamy et al. | 706/48 |
| 2010/0058313 A1* | 3/2010 | Hansmann et al. | 717/168 |
| 2011/0028138 A1 | 2/2011 | Davies-Moore et al. | |
| 2011/0040587 A1* | 2/2011 | Gerke et al. | 705/7 |
| 2011/0320395 A1* | 12/2011 | Dada et al. | 706/47 |
| 2012/0130936 A1* | 5/2012 | Brown et al. | 706/52 |

OTHER PUBLICATIONS

IBM, Features of IBM Tivoli Monitoring for Microsoft.NET: Content Management Server, Retrieved from the Internet: <http://publib.boulder.ibm.com/infocenter/tivihelp/v3r1/topic.tivoli.itmfmnet.doc/cont/pfuserguide.pdf>.

(Continued)

*Primary Examiner* — Jeffrey A Gaffin
*Assistant Examiner* — Mikayla Chubb
(74) *Attorney, Agent, or Firm* — Meyer IP Law Group

(57) ABSTRACT

Feature and deployment recommendation systems and methods for content management systems comprises a vendor-site deployment and one or more customer-site deployments. The vendor-site deployment is configured to recommend an adaptation of any of the one or more customer-site deployments. The vendor-site deployment including a customer configuration repository adapted to store content usage metrics received from one or more customer-site deployments, an analytical engine configured to generate content usage patterns based on the stored content usage metrics, and a recommendation engine configured to recommend the adaptation.

16 Claims, 2 Drawing Sheets

(56) References Cited

OTHER PUBLICATIONS

Microsoft Technet, Performance Optimization and Capacity Planning, Nov. 1, 2001, 21 pages. Retrieved from the Internet on Dec. 5, 2011: <http//:technet.microsoft.com/en-us/library/bb676162.aspx#EBAA>.

Microsoft Technet, Content Management Server-Accenture Portal Deployment Guide, 20 pages, Retrieved from the Internet on Dec. 5, 2011: <http//:technet.microsoft.com/en-us/library/bb676158.aspx>.

Monscierge, Manage Your Brand and Content Simply, 3 pages, Retrieved from the Internet on Dec. 5, 2011: <http//:www.monscierge.com/?content-control.

* cited by examiner

FEATURE AND DEPLOYMENT RECOMMENDATION SYSTEMS AND METHODS FOR CONTENT MANAGEMENT SYSTEMS TO PROVIDE RECOMMENDATIONS FOR ENHANCED FEATURE USAGE BASED ON USAGE PATTERNS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to content management systems and methods, and is particularly related to adapting content management systems based on feature usage patterns.

BACKGROUND

Enterprise Content Management ("ECM") is the strategies, methods and tools used to capture, manage, store, preserve, and deliver content and documents related to organizational processes. ECM covers the management of information within the entire scope of an enterprise whether that information is in the form of a paper document, an electronic file, a database print stream, or even an email. ECM encompasses document management, web content management, search, collaboration, records management, digital asset management, work-flow management, capture and scanning.

ECM is necessary to an organization for several reasons. One reason is the need to comply with regulations such as Sarbanes-Oxley or the Health Insurance Portability and Accountability Act. A proper compliance strategy ensures that proper business practices are followed and that content is properly captured, stored, managed, and disposed of at the appropriate and legal time in its lifecycle. Another reason is to effectively enable collaboration between individuals. Strong collaboration requires utilizing technologies (e.g. instant messaging, whiteboards, online meetings, email) that allow work to take place wherever and whenever needed. Another reason is to improve an organization's efficiency and drive down the cost of doing business by, for example, reducing business process delays and improving customer service interactions.

ECM is primarily aimed at managing the life-cycle of information from initial publication or creation all the way through archival and eventually disposal. ECM applications are delivered in three ways: on-premise software (installed on the organization's own network), Software-as-a-Service (web access to information that is stored on a vendor's system), or a hybrid solution composed of both on-premise and off-premise components. ECM aims to make the management of corporate information easier through simplifying storage, security, version control, process routing, and retention. The benefits to an organization include improved efficiency, better control, and reduced costs.

SUMMARY

In accordance with an embodiment of the invention, feature and deployment recommendation systems and methods for content management systems, comprise a vendor-site deployment and one or more customer-site deployments. The vendor-site deployment can include a customer configuration repository adapted to store content usage metrics received from the one or more customer-site deployments, an analytical engine, and a recommendation engine. The analytical engine of the vendor-site deployment is configured to generate content usage patterns based on the stored content usage metrics, while the recommendation engine is configured to recommend an adaptation of any of the one or more customer-site deployments based on the generated content usage patterns.

In some embodiments of the invention, the feature and deployment recommendation system further comprises a knowledge base adapted to store reference content usage patterns. The analytical engine is configured to compare the generated content usage patterns to the reference content usage patterns of the knowledge base. Based on the comparison of the generated content usage patterns to the reference content usage patterns of the knowledge base, the recommendation engine is configured to recommend an adaptation of any of the one or more customer-site deployments. In some embodiments, the knowledge base is adapted to store reference customer-site deployment configurations each associated with a reference content usage pattern. The adaptation recommended by the recommendation engine includes a reference customer-site deployment configuration associated with a reference content usage pattern that approximately matches one or more of the generated content usage patterns.

In some embodiments of the invention, the customer configuration repository of the content management system is adapted to store information indicating a configuration of each of the one or more customer-site deployments, and the knowledge base is adapted to store update information related to the one or more customer-site deployment configurations. Update information can include a current version number of the customer-site deployment configuration, any software patches, features and user metrics available to the customer-site deployment configuration, and/or other, and information intended for customer dissemination. The recommendation engine can forward the update information to the relevant content-site deployments.

In some embodiments of the invention, a knowledge base of the content management system can store content usage rules for comparison to the generated content usage patterns. The recommendation engine can recommend an adaptation of any of the one or more customer-site deployments based on the comparison of the generated content usage patterns to the content usage rules.

In some embodiments of the invention, each of the one or more customer-site deployments includes a collector for accumulating and storing the content usage metrics. The content usage metrics and related configuration can be uploaded from the collector and stored in the customer configuration repository when the analytical engine is triggered to generate content usage patterns. Alternatively, the content usage metrics can be uploaded on a periodic basis, or when initiated by the one or more customer-site deployments. Content usage metrics can optionally be stored in a customer configuration repository—either in a file system or in a database until needed.

In some embodiments of the invention, an adaptation of the one or more customer-site deployments is not recommended when the generated content usage patterns indicate that the one or more customer-site deployments are operating at a substantially optimal performance. In some embodiments, when the generated content usage patterns indicate substantially optimal performance, of a customer-site deployment, the generated content usage patterns are stored in the knowledge base as reference content usage patterns and a configuration of the customer-site deployment is stored in the knowledge base as a reference customer-site deployment configuration.

In accordance with an embodiment of the invention, a method of recommending an adaptation of one or more customer-site deployments of a content management system comprises accessing the one or more customer-site deployments, receiving content usage metrics related to the one or more customer-site deployments analyzing the content usage metrics, and recommending the adaptation based on the analysis. The analysis can be performed on an analytical engine off a vendor-site deployment.

In some embodiments of the invention, the method further comprises storing the content usage metrics in a customer configuration repository of the vendor-site deployment. Further, analyzing the content usage metrics can include generating content usage patterns and evaluating the generated content usage patterns based on a knowledge base of the vendor-site deployment. In some embodiments of the invention, the method further comprises storing the content usage metrics in a collector of the customer-site content management system, and periodically uploading the content usage metrics and configuration from the collector to the vendor-site deployment for storing in the customer configuration repository.

In some embodiments of the invention, the method of evaluating the generated content usage patterns includes comparing the generated content usage patterns to reference content usage patterns obtained from the knowledge base. Each of the reference content usage patterns can have an associated reference customer-site deployment configuration and usage pattern obtainable from the knowledge base. The recommended adaptation can be based on the reference customer-site deployment configuration associated with a reference content usage pattern that approximately matches the generated content usage pattern. In some embodiment, evaluating the generated content usage patterns includes comparing the generated content usage patterns to usage rules obtained from the knowledge base.

In some embodiments of the invention, the method includes the customer configuration repository storing configuration information for each of the one or more customer-site deployments and the knowledge base storing update information related to the one or more customer-site deployment configurations. The update information can include a current version number of the customer-site deployment configuration, one or more software patches, features, usage metrics, and/or information intended for customer dissemination.

In some embodiments, when the generated content usage patterns indicates substantially optimal performance of a customer-site deployment, the method further comprises storing the generated content usage patterns in the knowledge base as reference content usage patterns and storing a configuration of the customer-site deployment in the knowledge base as a reference customer-site deployment configuration.

DETAILED DESCRIPTION

Figure 1:
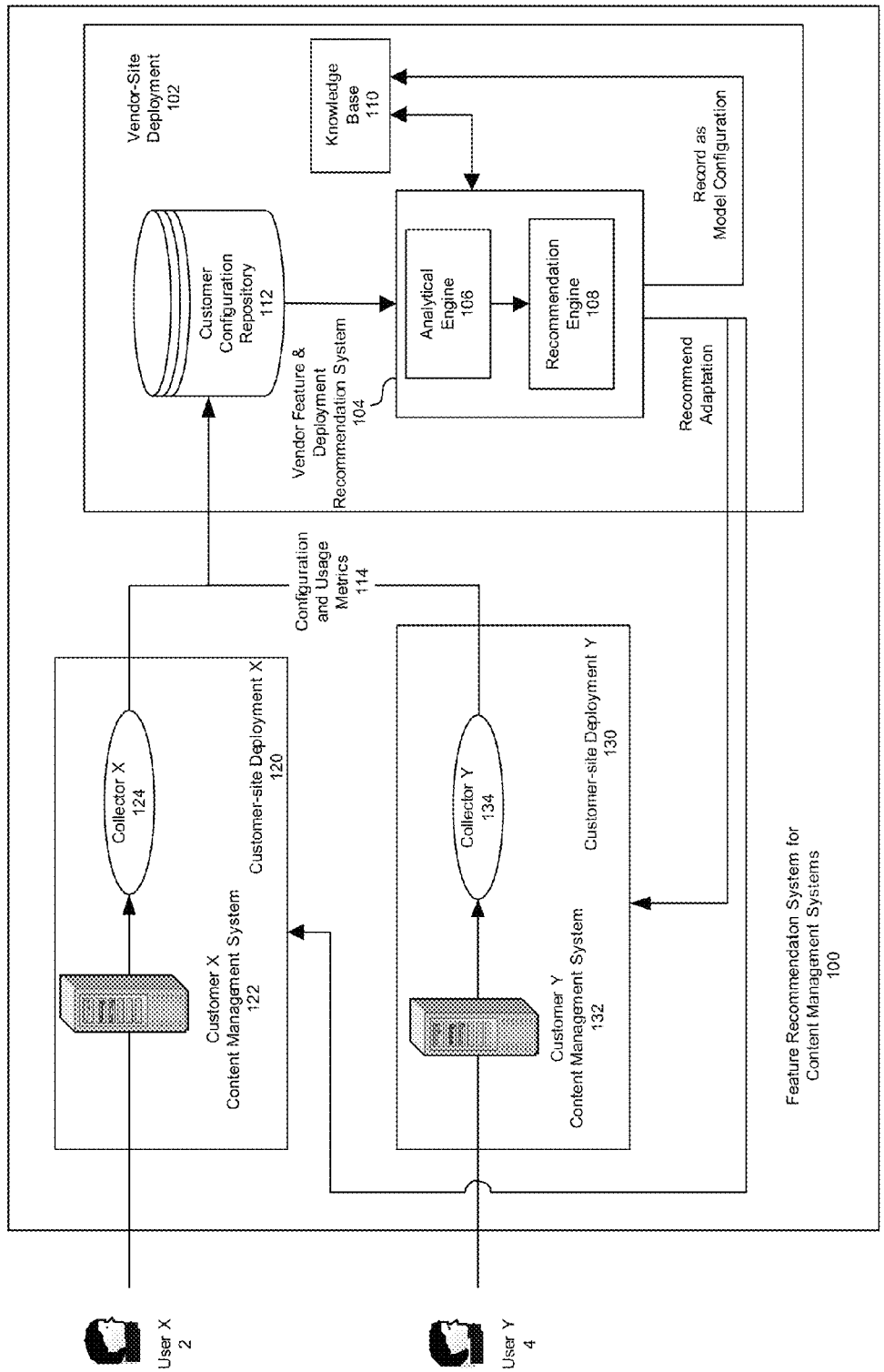
FIG. 1 shows an illustration of a content management system in accordance with an embodiment of the present invention.

Content management systems, including ECM systems, are typically designed, developed, and/or deployed for a customer in whole or in part by a vendor that provides continued maintenance support and/or content storage services to the customer. Product development and management teams typically do not have access to detailed product usage information at customer deployments. During the initial stages of deployment at a customer site (or customer sites), cross-functional teams engage in capacity planning and in bringing the content management system online. Once the deployment is complete, the content management system continues to operate with a designed-for architecture (also referred to herein as an original configuration) with any system break downs, problems, or other issues being addressed by the vendor as and when they arise, and resolved as needed and as appropriate to the original configuration.

As time passes, initial assumptions used for design and deployment of a content management system often are no longer valid or are only partially valid. For example, as a user base of a content management system expands with business growth, content can quickly accumulate and feature usage can vary. As a result, a customer may encounter problems with the content management system, such as degraded performance, or the customer may experience generally acceptable, but non-optimal, performance. However, customer issues that may arise which are not product defects per se can only be responded to by development and support teams with generic recommendations, such as recommendations to turn a feature on or off, to use advanced performance features, to use new features in the latest product releases etc. Modifications to the original configuration are typically limited to software version updates and software patches substantially directed to universal issues found to affect performance of the original configuration as designed. Such modifications are generally not intended to adapt the original configuration to suit changes in customer usage.

In the absence of real usage data from customer environments, development and support teams cannot make recommendations in the context of the deployment. Embodiments of systems and methods in accordance with the present invention can be applied to collect and analyze customer usage metrics in order to adapt, or recommend adapting the architecture (also referred to herein as the configuration) of one or more customer-site deployments of a content management system. Customer usage metrics can include, but are not limited to, specific product feature usage, file partitioning, and native file and web rendition information. The adapted configuration can more efficiently manage the customer's needs, for example by taking into account capacity and feature usage, thereby improving performance and reducing problems encountered by the customer relative to the original configuration. Embodiments of systems and methods in accordance with the present invention can also be applied to improve the initial stages of planning and deployment at a new customer site by providing reference configurations that can be informed by, and continuously improved by, real usage data from a large customer base.

Referring to FIG. 1, an embodiment of a content management system 100 in accordance with the present invention capable of recommending an adaptation of one or more customer-site deployments is shown. The content management system 100 is a hybrid system comprising customer-site deployments (also referred to as customer environments) 120, 130 and a vendor-site deployment (also referred to as a vendor environment) 102. For purposes of illustration, and as a matter of convention, the content management system 100 is described as including customer-site deployments for multiple different customers. Customer-site deployments for two customers, Customer X and Customer Y, are shown, although the number of customer-site deployments can include a single customer-site deployment or multiple customer-site deployments. The number of customer-site deployments can be as large as is supportable by the vendor-site deployment. However, FIG. 1 can alternatively be thought to include multiple separate content management systems, each content management system including a single customer-site deployment and the vendor-site deployment common to multiple customer-site deployments. Still further, a content management system in accordance with the present invention can be defined as multiple customer-site deployments for a single customer and the vendor-site deployment. For example, a customer might be a corporation divided into divisions, each division including a separate customer-site deployment. Embodiments of content management systems in accordance with the present invention are intended to include any and all of the above conventions, and are intended to be limited only by the scope of the claims.

Each of the customer-site deployments 120, 130 of the content management system 100 comprises a configuration that is a combination of software and hardware. The configurations of each of the customer-site deployments 120, 130 can vary with respect to the complexity and industrial design of the software and hardware. For example, customer-site deployment X 120 can include a configuration designed to be accessed by tens of thousands of users at any given time, where the users 2 have a wide variety of jobs and skills and rely on different software features to perform tasks. Customer-site deployment X 120 can include hardware appropriate to manage the content generated by the relatively large user base, including multiple content management servers 122 and software having an intuitive interface accessible organization-wide, such as a graphical user-interface (GUI) and/or a web-based intranet. Customer-site deployment Y 130 can include a configuration designed to be accessed by hundreds of users at any given time, with the users 4 of customer-site deployment Y 130 having a narrower range of expertise compared with the user base of customer X 120. Customer-site deployment Y 130 can include a single content management server 132 to manage the content generated by its user base, and software having a specialized interface, for example with fields for entering data in a limited number of forms accessed from a limited numbers of menu options. The two scenarios presented are for purposes of illustration, and customer-site deployments can vary widely between customers.

The vendor-site deployment 102 can provide different levels of service to the customer-site deployments 120, 130. For example, users 2, 4 access content items stored in content repositories (not shown) of the content management system. A content repository can be a database maintained in any storage medium local to, adjacent to, or remote from a server, or other computing device that facilitates access to the content item. If a customer-site deployment accesses a content repository stored at the vendor-site deployment (i.e. remotely from the customer-site deployment), the vendor-site deployment provides increased service as compared with a customer-site deployment that accesses a content repository stored at the customer-site deployment (i.e. locally to the customer-site deployment). Increased services, such as cross-customer comparisons and use of configuration standards for various usage patterns and load topologies, cannot be provided where the content repository is stored at the customer-site deployment. Increased services are only possible where the content repository is stored at the vendor-site deployment, thereby allowing the vendor to pool data from multiple customers. The vendor-site deployment 102 shown in FIG. 1 includes components that can be used with different levels of service provided by the vendor to customers; therefore, components such as content repositories are not shown.

The vendor-site deployment 102 comprises a customer configuration repository 112 adapted to store configuration information about each of the customer-site deployments 120, 130. As the configuration for each of the customer-site deployments 120, 130 changes, the configuration information is updated in the customer configuration repository 112. The customer configuration repository 112 is also adapted to store the customer usage metrics collected from the customer-site deployments 120, 130. In some embodiments, the customer-site deployments 120, 130 include collectors 124, 134 that aggregate the customer usage metrics and configuration information for the respective customer-site deployments 120, 130. Aggregated data 114 of customer usage metrics and configuration information can then be uploaded to the customer configuration repository 112 by way of a secured connection. The aggregated data 114 can be uploaded on a periodic basis, or, for example, when triggered or otherwise initiated by the vendor-site deployment 102 or by the customer-site deployment 120, 130. Also, the data transfer can be left to the customer and if the customer so desires, there can be no data upload from the customer site to the vendor site.

The vendor-site deployment 102 further comprises a feature and deployment recommendation system 104 including an analytical engine 106 and a recommendation engine 108. The analytical engine 106 and the recommendation engine 108 can have separate algorithms running on one or more processors of the vendor deployment, for example. The algorithms can be executed in sequence as a single application, or the algorithms can be executed separately. The analytical engine 106 receives content usage metrics from the customer configuration repository 112 and generates content usage patterns based on the content usage metrics. For example, the analytical engine 106 can generate a pattern of content generation and feature usage (and feature non-usage) to assess allocation of resources, file folder structure, dynamic indices structure, etc.

The analytical engine 106 can access and receive information from a knowledge base 110 of the vendor-site deployment 102 for comparison with the generated content usage pattern. As shown, the knowledge base 110 is a database maintained in a storage medium separate from the vendor deployment 102, but can alternatively be a component of the vendor deployment 102. The knowledge base 110 can include reference content usage patterns and associated reference customer-site deployment configurations. The reference content usage patterns can include patterns generated by other customers who are considered to have satisfactorily performing content management systems. Reference customer-site deployment configurations associated with the reference content usage patterns can likewise be generated from the satisfactorily performing content management systems. Alternatively, the reference content usage patterns can be generated by the vendor based on predicted or observed content usage patterns, and can include best-known solutions for customer-content deployments exhibiting such usage patterns. In addition, or alternatively, the knowledge base 110 can include pre-defined rules, some of which may not necessarily be based on observed usage patterns.

The analytical engine 106 performs the comparisons to the reference content usage patterns and/or rules and the recommendation engine 108 assembles and issues to the customer, recommendations for adapting one or more customer-site deployments based on the comparisons. The recommendations assembled and issued by the recommendation engine 108 generally can include customized advisories and/or suggestions given to an individual customer based on their feature usage, or generic advisories and/or suggestions issued to all customers, based on knowledge acquired from various reference customers.

There are numerous different possible scenarios for recommending and adapting the customer-site deployment. For example, if a customer is using a component or feature of the customer-site deployment which is dated compared to an alternative component or feature, or which is not the most recent version of the component or feature, the recommendation engine 108 can suggest that the customer replace the component or feature with an appropriate substitute, where that substitute is known to provide better functionality and performance compared to the existing component or feature.

For another example, if a customer is organizing documents or other content items within folders of a certain folder structure that has a revision available from the vendor, a rule can be included that requires that if a customer has more than some number of folders (e.g. fifty thousand folders) of the folder structure for which a revision is available, the recommendation engine 108 can suggest to the customer that the configuration should be adapted to use the revised folder structure.

For another example, if a customer is organizing documents or other content items within folders and the number of folders within the content management system exceeds a pre-defined number associated with satisfactory performance, the recommendation engine 108 can advise the customer that the number of folders within the content management system is likely degrading the performance and can suggest to the customer that the number of folders should be limited and/or reduced to improve performance.

For another example, if the content items stored in a physical partition of a hard disk drive reaches a pre-defined volume of data, the recommendation engine 108 can advise the customer that the volume of data is likely degrading the performance and suggest to the customer that certain folders can be moved to a different physical partition on the hard disk drive, to improve performance. If there are multiple techniques for storing the content items, for example if the content items can be stored within a database or within a file system, the suggestion to the customer can include a suggested technique for storing the content items. Such suggestions can be dependent on the data volume and other requirements.

For another example, if the performance of database queries that are running in the application is inefficient, the recommendation engine 108 can advise the customer that proper indices are not in place and that the database queries can be improved. The recommendation engine 108 can further suggest the proper indices that can be added to the database.

The recommendation engine can be helpful in the planning phase as well. For another example, the recommendation engine 108 can suggest configuration details during capacity planning for a customer-site deployment based on data collected from multiple customers and/or from specific reference customer. For example, the collected data or reference data could inform on how many servers will be needed in a customer-site deployment by the type of data and expected volume of data to be collected by the customer-site deployment.

The examples given above are not exhaustive, and are merely intended to give a limited sense of the range of possibilities for recommending adaptation of customer-site deployments to improve overall performance of the content management system based on content usage metrics. In addition, the recommendation engine 108 can further monitor and provide recommendations of software version updates and software patches substantially directed to universal issues found to affect performance of the original configuration as designed.

In addition to providing recommendations for adapting the customer-site deployment, the analytical engine 106 and recommendation engine 108 can be used to identify customer-site deployment 120, 130 configurations having content usage patterns that indicate substantially optimal performance. The generated content usage patterns can be stored in the knowledge base as reference content usage patterns, and the configuration information of the customer-site deployment can be stored in the knowledge base as a reference customer-site deployment configuration.

Figure 2:
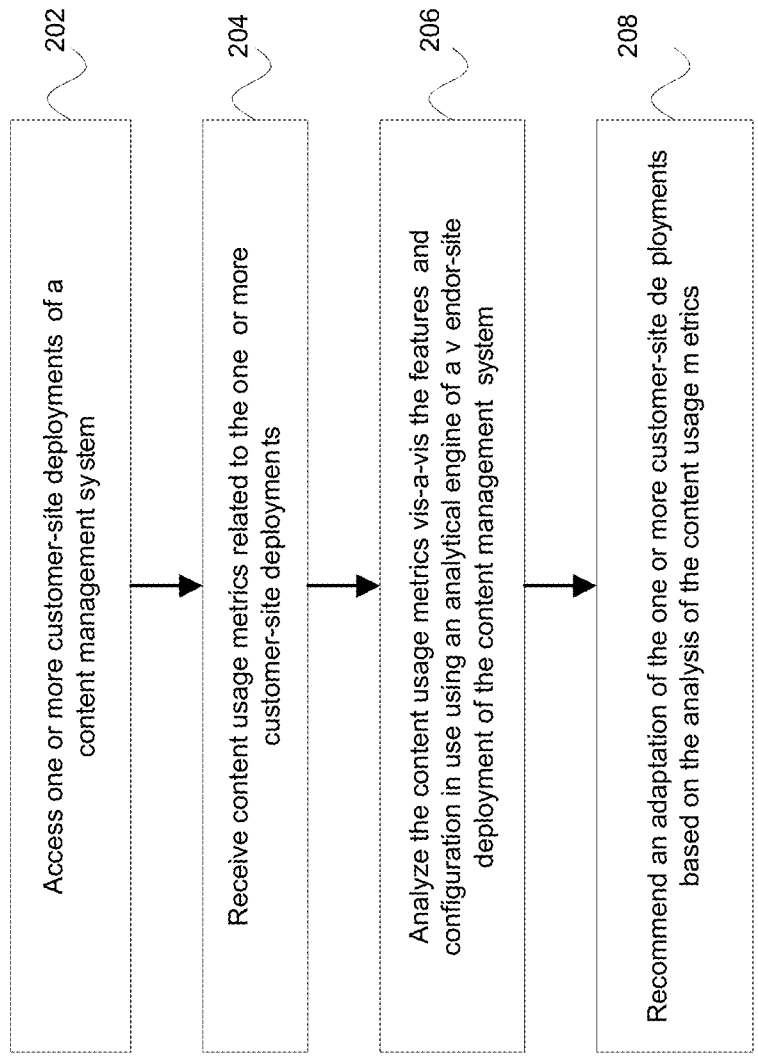
FIG. 2 shows a flowchart of a method of recommending an adaptation of one or more customer-site deployments of a content management system in accordance with an embodiment of the present invention.

FIG. 2 is a flowchart of a method of recommending an adaptation of one or more customer-site deployments of a content management system in accordance with an embodiment of the present invention. The content management system includes the one or more customer-site deployments and a vendor-site deployment. The one or more customer-site deployments are accessed (Step 202) and content usage data related to the one or more customer-site deployments is received by the vendor-site deployment (Step 204). The content usage data can optionally be aggregated, prior to being accessed, in a collector of each of the one or more customer-site deployments along with configuration information related to the respective customer-site deployment. The content usage metrics are then analyzed using an analytical engine of the vendor-site deployment (Step 206). The analysis can include generating content usage patterns of the content usage metrics. The generated content usage patterns can be compared with reference content usage patterns or pre-defined rules. The vendor-site deployment then recommends an adaptation of the one or more customer-site deployments based on the analysis of the content usage metrics (Step 208). The recommendations can be forwarded to the one or more customer-site deployments, optionally including software version updates and software patches relevant to the one or more customer-site deployments. Optionally, a configuration of a customer-site deployment having a generated content usage pattern deemed to reflect a substantially optimal performance can be forwarded to a knowledge base to act as a reference configuration.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A feature and deployment recommendation system for content management systems operable on one or more microprocessors, the content management system comprising:
   a vendor-site deployment including a customer configuration repository adapted to store content usage metrics received from one or more customer-site deployments;
   an analytical engine configured to generate content usage patterns based on the stored content usage metrics;
   a recommendation engine configured to recommend an adaptation of any of the one or more customer-site deployments based on the generated content usage patterns; and
   a knowledge base adapted to store reference content usage patterns;
   wherein when the generated content usage patterns indicate substantially optimal performance of the one or more customer-site deployments, an adaptation of the one or more customer-site deployments is not recommended; and
   wherein when the generated content usage patterns indicates substantially optimal performance of a customer-site deployment from the one or more customer-site deployments, the generated content usage patterns for the customer-site deployment are stored in the knowledge base as reference content usage patterns and a configuration of the customer-site deployment is stored in the knowledge base as a reference customer-site deployment configuration.

2. The feature and deployment recommendation system for content management systems of claim 1;
   wherein the analytical engine is configured to compare the generated content usage patterns to the reference content usage patterns of the knowledge base;
   wherein the recommendation engine is configured to recommend an adaptation of any of the one or more customer-site deployments based on the comparison of the generated content usage patterns to the reference content usage patterns of the knowledge base.

3. The feature and deployment recommendation system for content management system of claim 2,
   wherein the knowledge base is adapted to store reference customer-site deployment configurations each associated with a reference content usage pattern; and
   wherein the adaptation recommended by the recommendation engine includes a reference customer-site deployment configuration associated with a reference content usage pattern that approximately matches one or more of the generated content usage patterns.

4. The feature and deployment recommendation system for content management system of claim 3,
   wherein the customer configuration repository is adapted to store information indicating a configuration of each of the one or more customer-site deployments; and
   wherein the knowledge base is adapted to store update information related to the one or more customer-site deployment configurations; and
   wherein the update information includes one or more of a current version number of the customer-site deployment configuration, one or more software patches, and information intended for customer dissemination;
   wherein the recommendation engine is configured to forward the update information to the one or more content-site deployments.

5. The feature and deployment recommendation system for content management system of claim 1,
   wherein the knowledge base is adapted to store content usage rules;
   wherein the analytical engine is configured to compare the generated content usage patterns to the content usage rules of the knowledge base; and
   wherein the recommendation engine is configured to recommend an adaptation of any of the one or more customer-site deployments based on the comparison of the generated content usage patterns to the content usage rules.

6. The feature and deployment recommendation system for content management system of claim 1, wherein the analytical engine generates the content usage patterns and the recommendation engine recommends the adaptation based on the generated content usage patterns on a periodic basis.

7. The feature and deployment recommendation system for content management system of claim 1, wherein the one or more customer-site deployments each include a collector for accumulating and storing the content usage metrics; and
   wherein when the analytical engine is triggered to generate content usage patterns, the content usage metrics are uploaded from the collector and stored in the customer configuration repository.

8. A method of recommending an adaptation of one or more customer-site deployments of a content management system operable on one or more microprocessors, the method comprising:
   accessing the one or more customer-site deployments;
   receiving content usage metrics related to the one or more customer-site deployments;
   analyzing the content usage metrics using an analytical engine of a vendor-site deployment of the content management system;
   recommending an adaptation of the one or more customer-site deployments based on the analysis of the content usage metrics;
   storing the content usage metrics in a customer configuration repository of the vendor-site deployment;
   analyzing the content usage metrics including generating content usage patterns and evaluating the generated content usage patterns based on a knowledge base of the vendor-site deployment; and
   storing, when the generated content usage patterns indicates substantially optimal performance of a customer-site deployment from the one or more customer-site deployments, the generated content usage patterns for the customer-site deployment in the knowledge base as reference content usage patterns and storing a configuration of the customer-site deployment in the knowledge base as a reference customer-site deployment configuration.

9. The method of claim 8, further comprising:
storing the content usage metrics in a collector of the customer-site content management system; and
periodically uploading the content usage metrics from the collector to the vendor-site content management system for storing in the customer configuration repository.

10. The method of claim 8, wherein evaluating the generated content usage patterns includes comparing the generated content usage patterns to reference content usage patterns; and
wherein the reference content usage patterns are obtained from the knowledge base.

11. The method of claim 10, wherein each of the reference content usage patterns has an associated reference customer-site deployment configuration obtainable from the knowledge base; and
wherein the recommended adaptation is based on the reference customer-site deployment configuration associated with a reference content usage pattern that approximately matches the generated content usage pattern.

12. The method of claim 8,
wherein the customer configuration repository is adapted to store information indicating a configuration of each of the one or more customer-site deployments; and
wherein the knowledge base is adapted to store update information related to the one or more customer-site deployment configurations; and
wherein the update information includes one or more of a current version number of the customer-site deployment configuration, one or more software patches, and information intended for customer dissemination;
wherein recommending the adaptation includes forwarding the update information to the one or more content-site deployments.

13. The method of claim 8, wherein evaluating the generated content usage patterns includes comparing the generated content usage patterns to content usage rules; and
wherein the usage rules are obtained from the knowledge base.

14. A non-transitory computer readable storage medium, including instructions stored thereon, which when read and executed by one or more microprocessors cause the one or more microprocessors to perform the steps comprising:
accessing one or more customer-site deployments of a content management system;
receiving content usage metrics related to the one or more customer-site deployments;
analyzing the content usage metrics using an analytical engine of a vendor-site deployment of the content management system;
recommending an adaptation of the one or more customer-site deployments based on the analysis of the content usage metrics;
storing the content usage metrics in a customer configuration repository of the vendor-site deployment;
analyzing the content usage metrics including generating content usage patterns and evaluating the generated content usage patterns based on a knowledge base of the vendor-site deployment; and
storing, when the generated content usage patterns indicates substantially optimal performance of a customer-site deployment from the one or more customer-site deployments, the generated content usage patterns for the customer-site deployment in the knowledge base as reference content usage patterns and storing a configuration of the customer-site deployment in the knowledge base as a reference customer-site deployment configuration.

15. The non-transitory computer readable storage medium of claim 14,
wherein analyzing the content usage metrics includes generating content usage patterns and comparing the generated content usage patterns to one or both of reference content usage patterns and content usage rules; and
wherein the reference content usage patterns and the content usage rules are obtained from a knowledge base of the vendor-site deployment.

16. The non-transitory computer readable storage medium of claim 14, further including instructions stored thereon, which when read and executed by one or more microprocessors cause the one or more microprocessors to perform the step further comprising:
forwarding update information to the one or more content-site deployments as the recommended adaptation;
wherein the customer configuration repository is adapted to store information indicating a configuration of each of the one or more customer-site deployments; and
wherein the update information includes one or more of a current version number of the customer-site deployment configuration, one or more software patches, and information intended for customer dissemination; and
wherein the knowledge base is adapted to store the update information related to the one or more customer-site deployment configurations.

* * * * *

UNITED STATES PATENT AND TRADEMARK OFFICE
CERTIFICATE OF CORRECTION

PATENT NO.        : 8,924,336 B2                             Page 1 of 1
APPLICATION NO.   : 13/542392
DATED             : December 30, 2014
INVENTOR(S)       : Rao et al.

It is certified that error appears in the above-identified patent and that said Letters Patent is hereby corrected as shown below:

In the Drawings

On sheet 2 of 2, in figure 2, under Reference Numeral 206, line 2, delete "v endor-site" and insert -- vendor-site --, therefor.

On sheet 2 of 2, in figure 2, under Reference Numeral 208, line 1, delete "de ployments" and insert -- deployments --, therefor.

On sheet 2 of 2, in figure 2, under Reference Numeral 208, line 2, delete "m etrics" and insert -- metrics --, therefor.

Signed and Sealed this
First Day of September, 2015

Michelle K. Lee
*Director of the United States Patent and Trademark Office*